(12) United States Patent
Good

(10) Patent No.: US 8,523,076 B2
(45) Date of Patent: Sep. 3, 2013

(54) OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION

(75) Inventor: Timothy Good, Clementon, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/347,219

(22) Filed: Jan. 10, 2012

(65) Prior Publication Data

US 2013/0175343 A1 Jul. 11, 2013

(51) Int. Cl.
*G02B 5/00* (2006.01)
*G06K 7/10* (2006.01)

(52) U.S. Cl.
USPC .................................................. 235/462.32

(58) Field of Classification Search
USPC ......................................................... 235/462
See application file for complete search history.

(56) References Cited

U.S. PATENT DOCUMENTS

| | | |
|---|---|---|
| 3,774,014 A | 11/1973 | Berler |
| 3,796,863 A | 3/1974 | Nickl et al. |
| 3,902,048 A | 8/1975 | Fleischer et al. |
| 3,947,816 A | 3/1976 | Rabedeau |
| 3,958,104 A | 5/1976 | Zuckerman |
| 4,007,377 A | 2/1977 | Simon et al. |
| 4,093,865 A | 6/1978 | Nickl |
| 4,333,006 A | 6/1982 | Gorin et al. |
| 4,360,798 A | 11/1982 | Swartz et al. |
| 4,570,057 A | 2/1986 | Chadima, Jr. et al. |
| 4,587,407 A | 5/1986 | Ahmed et al. |
| 4,647,143 A | 3/1987 | Yamazaki et al. |
| 4,652,732 A | 3/1987 | Nickl |
| 4,687,282 A | 8/1987 | Ferrante |
| 4,766,300 A | 8/1988 | Chadima, Jr. et al. |
| 4,794,237 A | 12/1988 | Ferrante |
| 4,794,240 A | 12/1988 | Schorr et al. |
| 4,795,224 A | 1/1989 | Goto |
| 4,799,164 A | 1/1989 | Hellekson et al. |
| 4,805,175 A | 2/1989 | Knowles |
| 4,816,661 A | 3/1989 | Krichever et al. |
| 4,839,507 A | 6/1989 | May |
| 4,848,862 A | 7/1989 | Yamazaki et al. |
| 4,851,667 A | 7/1989 | Mergenthaler et al. |
| 4,861,973 A | 8/1989 | Hellekson et al. |
| 4,867,257 A | 9/1989 | Kuchler |
| 4,879,456 A | 11/1989 | Cherry et al. |
| 4,894,523 A | 1/1990 | Chadima, Jr. et al. |
| 4,939,355 A | 7/1990 | Rando et al. |
| 4,960,985 A | 10/1990 | Knowles |

(Continued)

*Primary Examiner* — Daniel Hess
*Assistant Examiner* — Steven J Malone
(74) *Attorney, Agent, or Firm* — Summa, Additon & Ashe, P.A.

(57) ABSTRACT

An improved laser scanning system is provided employing multiple off-center lasers and an irregular multi-sided scanning polygon, producing a laser scanning raster over a total sweep of approximately 180 degrees of polygon rotation (i.e. sweep), wherein the scanning region includes (i) a center scanning region with a first plurality of scanning lines, (ii) two mid scanning regions with a second plurality of scanning lines, and (iii) far left and right scanning regions each having a third plurality of scanning lines, to supports high (full) density, mid (⅔) density, and low (⅓) density scanning over the 180 degrees scanning region, for robust omni-directional scanning performance.

20 Claims, 9 Drawing Sheets

(56) References Cited

U.S. PATENT DOCUMENTS

| | | | |
|---|---|---|---|
| 4,968,883 | A | 11/1990 | Leyshon et al. |
| 5,000,529 | A | 3/1991 | Katoh et al. |
| 5,019,694 | A | 5/1991 | Collins, Jr. |
| 5,019,714 | A | 5/1991 | Knowles |
| 5,025,477 | A | 6/1991 | Baitz et al. |
| 5,026,975 | A | 6/1991 | Guber et al. |
| 5,028,772 | A | 7/1991 | Lapinski et al. |
| 5,039,184 | A * | 8/1991 | Murakawa et al. ........ 359/216.1 |
| 5,042,619 | A | 8/1991 | Kohno |
| 5,073,702 | A | 12/1991 | Schuhmacher |
| 5,081,364 | A | 1/1992 | Wike, Jr. |
| 5,124,538 | A | 6/1992 | Lapinski et al. |
| 5,128,520 | A | 7/1992 | Rando et al. |
| 5,132,524 | A | 7/1992 | Singh et al. |
| 5,206,491 | A | 4/1993 | Katoh et al. |
| 5,229,588 | A | 7/1993 | Detwiler et al. |
| 5,239,169 | A | 8/1993 | Thomas |
| 5,252,814 | A | 10/1993 | Tooley |
| 5,256,864 | A | 10/1993 | Rando et al. |
| 5,266,788 | A | 11/1993 | Yamazaki et al. |
| 5,268,565 | A | 12/1993 | Katoh et al. |
| 5,286,961 | A | 2/1994 | Saegusa |
| 5,291,008 | A | 3/1994 | Havens et al. |
| 5,293,033 | A | 3/1994 | Yamashita |
| 5,296,691 | A | 3/1994 | Waldron et al. |
| 5,331,118 | A | 7/1994 | Jensen |
| 5,361,158 | A | 11/1994 | Tang |
| 5,396,054 | A | 3/1995 | Krichever et al. |
| 5,410,108 | A | 4/1995 | Williams et al. |
| 5,459,308 | A | 10/1995 | Detwiler et al. |
| 5,466,921 | A | 11/1995 | Lapinski et al. |
| RE35,117 | E | 12/1995 | Rando et al. |
| 5,475,207 | A | 12/1995 | Bobba et al. |
| 5,491,328 | A | 2/1996 | Rando |
| 5,493,108 | A | 2/1996 | Cherry et al. |
| 5,495,097 | A | 2/1996 | Katz et al. |
| 5,504,316 | A | 4/1996 | Bridgelall et al. |
| 5,519,198 | A | 5/1996 | Plesko |
| 5,525,786 | A | 6/1996 | Dumont |
| 5,541,419 | A | 7/1996 | Arackellian |
| 5,557,093 | A | 9/1996 | Knowles et al. |
| 5,572,007 | A | 11/1996 | Aragon et al. |
| 5,591,952 | A | 1/1997 | Krichever et al. |
| 5,594,231 | A | 1/1997 | Pellicori et al. |
| 5,629,511 | A | 5/1997 | Iwaguchi et al. |
| 5,677,522 | A | 10/1997 | Rice et al. |
| 5,684,289 | A | 11/1997 | Detwiler et al. |
| 5,689,102 | A | 11/1997 | Schonenberg et al. |
| 5,693,930 | A | 12/1997 | Katoh et al. |
| 5,705,802 | A | 1/1998 | Bobba et al. |
| 5,717,195 | A | 2/1998 | Feng et al. |
| 5,723,852 | A | 3/1998 | Rando et al. |
| 5,744,815 | A | 4/1998 | Gorevich et al. |
| 5,777,314 | A | 7/1998 | Roustaei |
| 5,778,133 | A | 7/1998 | Plesko |
| 5,801,370 | A | 9/1998 | Katoh et al. |
| 5,834,708 | A | 11/1998 | Svetal et al. |
| 5,837,988 | A | 11/1998 | Bobba et al. |
| 5,869,827 | A | 2/1999 | Rando |
| 5,886,336 | A | 3/1999 | Tang et al. |
| 5,892,214 | A | 4/1999 | Lindacher et al. |
| 5,909,300 | A | 6/1999 | Araki et al. |
| 5,942,743 | A | 8/1999 | Schmidt et al. |
| 5,975,417 | A | 11/1999 | Spencer et al. |
| 5,978,772 | A | 11/1999 | Mold |
| 5,984,186 | A | 11/1999 | Tafoya |
| 6,045,046 | A | 4/2000 | Detwiler |
| 6,059,189 | A | 5/2000 | Detwiler et al. |
| 6,064,423 | A | 5/2000 | Geng |
| 6,069,700 | A | 5/2000 | Rudnick et al. |
| 6,098,885 | A | 8/2000 | Knowles et al. |
| 6,112,857 | A | 9/2000 | Morrison |
| 6,117,080 | A | 9/2000 | Schwartz |
| 6,189,795 | B1 | 2/2001 | Ohkawa et al. |
| 6,213,397 | B1 | 4/2001 | Rando |
| RE37,166 | E | 5/2001 | Rando et al. |
| 6,223,986 | B1 | 5/2001 | Bobba et al. |
| 6,237,852 | B1 | 5/2001 | Svetal et al. |
| 6,285,383 | B1 | 9/2001 | Klement et al. |
| 6,296,187 | B1 | 10/2001 | Shearer |
| 6,325,290 | B1 | 12/2001 | Walter et al. |
| 6,330,973 | B1 | 12/2001 | Bridgelall et al. |
| 6,330,974 | B1 | 12/2001 | Ackley |
| 6,462,880 | B1 | 10/2002 | Ohkawa et al. |
| 6,491,224 | B2 | 12/2002 | Ohkawa et al. |
| 6,536,668 | B1 | 3/2003 | Detwiler et al. |
| 6,568,598 | B1 | 5/2003 | Bobba et al. |
| 6,631,845 | B2 | 10/2003 | Barkan |
| 6,814,292 | B2 | 11/2004 | Good |
| 6,918,540 | B2 | 7/2005 | Good |
| 6,951,304 | B2 | 10/2005 | Good |
| 6,974,084 | B2 | 12/2005 | Bobba et al. |
| 6,991,169 | B2 | 1/2006 | Bobba et al. |
| 7,086,597 | B2 | 8/2006 | Good |
| 7,296,748 | B2 | 11/2007 | Good |
| 7,314,176 | B2 | 1/2008 | Good |
| 7,341,192 | B2 | 3/2008 | Good |
| 7,374,094 | B2 | 5/2008 | Good |
| 7,383,996 | B2 | 6/2008 | Good et al. |
| 7,407,103 | B2 | 8/2008 | Check et al. |
| 7,422,156 | B2 | 9/2008 | Good |
| 2001/0017320 | A1 | 8/2001 | Knowles et al. |
| 2002/0038820 | A1 * | 4/2002 | Check et al. ............. 235/462.14 |
| 2002/0043564 | A1 | 4/2002 | Ohkawa et al. |
| 2002/0162887 | A1 | 11/2002 | Detwiler |
| 2003/0102377 | A1 | 6/2003 | Good |
| 2005/0098634 | A1 | 5/2005 | Good |
| 2011/0248087 | A1 * | 10/2011 | Kakino et al. ............. 235/462.4 |
| 2011/0309147 | A1 * | 12/2011 | Barkan et al. ................. 235/440 |

* cited by examiner

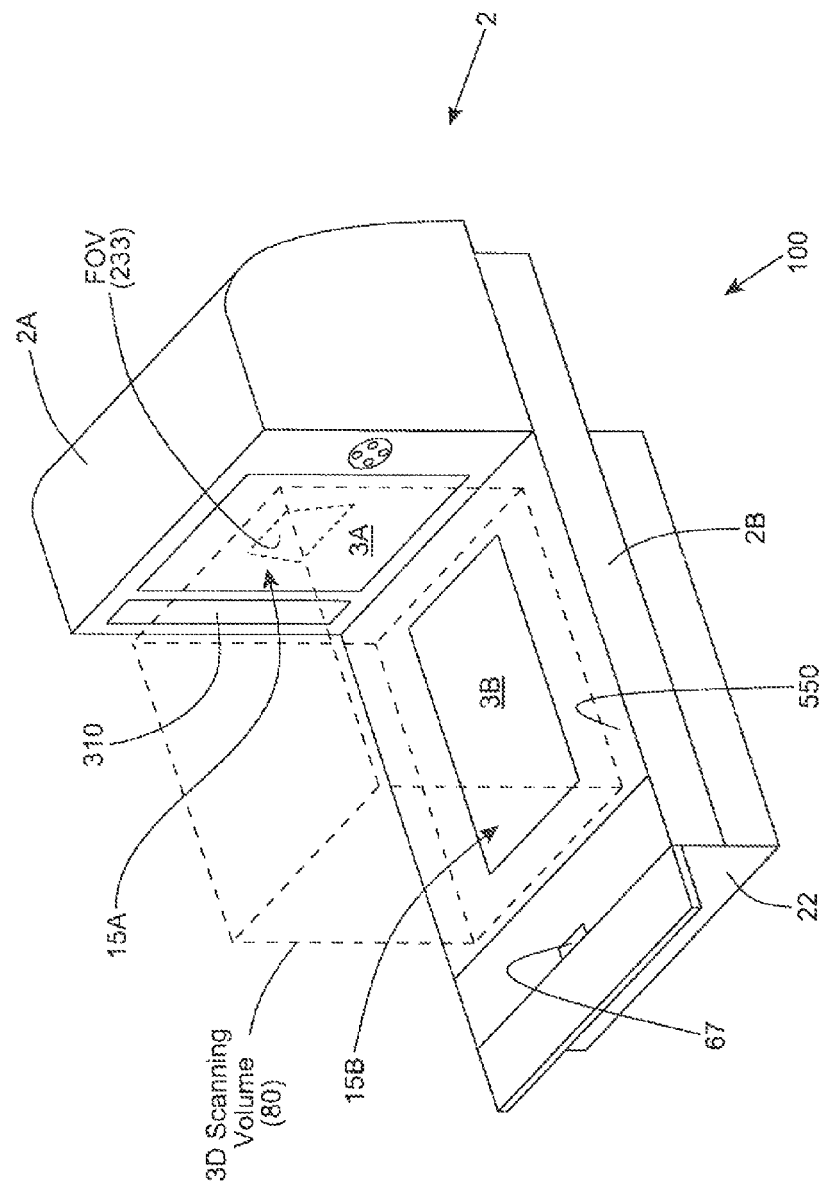

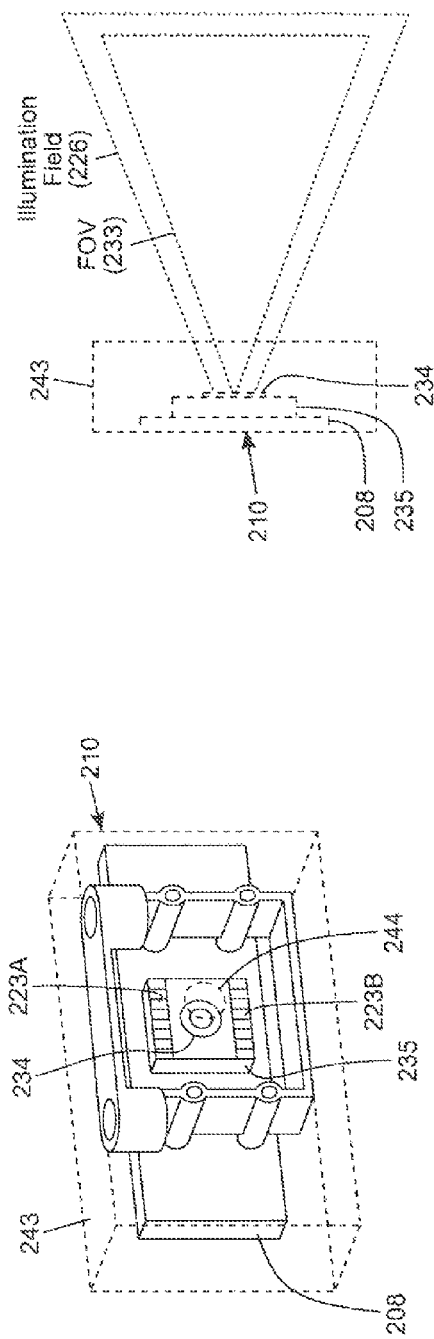
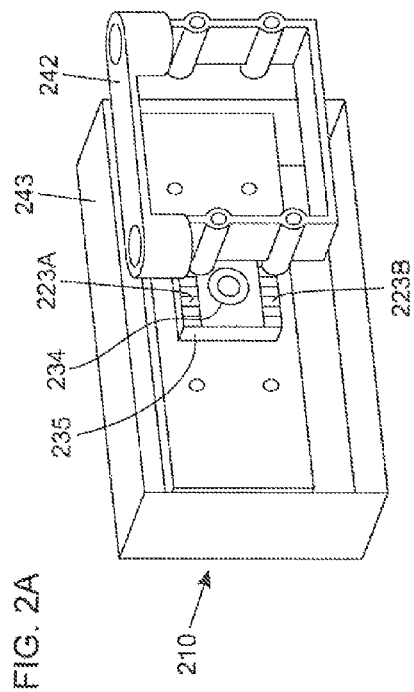

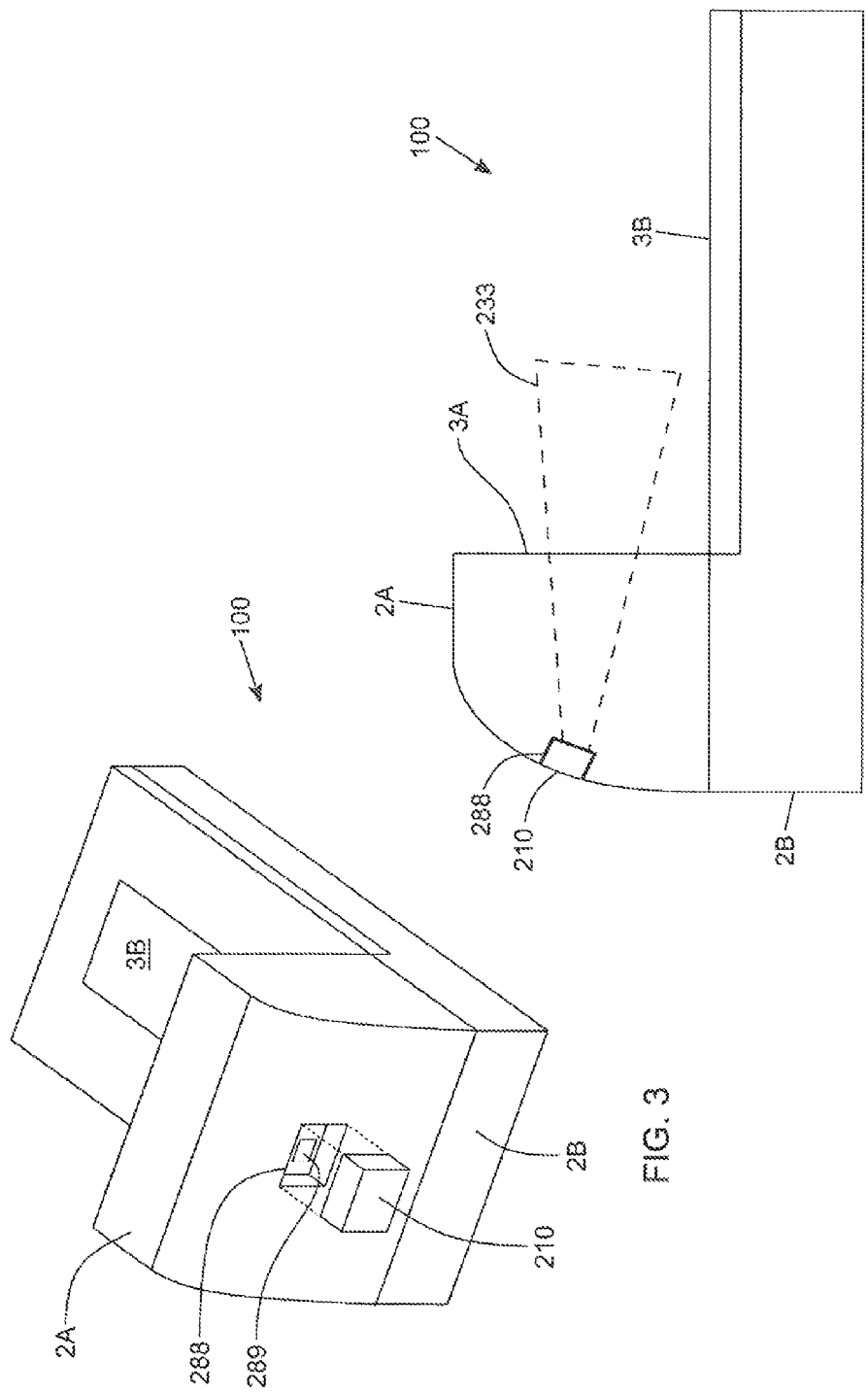

OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION

BACKGROUND OF DISCLOSURE

1. Field of Disclosure

The present disclosure relates generally to improvements in laser scanning bar code symbol reading systems, at point-of-sale (POS) environments and elsewhere, with increased scanning flexibility and high throughput.

2. Brief Description of the State of Knowledge in the Art

Typically, omni-directional laser scanning bar code symbol readers employ a regular polygon shape which produces a consistent, uniform raster laser scanning pattern through a certain sweep angle. For example, a common scanning polygon has an approximate square profile producing a 4-line raster through nearly 180 degrees of sweep. The deficiency in this uniform raster is that when the laser scanning lines are folded into an intersecting 3D scanning volume for omni-directional performance, all field angles experience the same number of laser scanning lines. This is not optimal for uniform omni-directional performance.

Typically, bar codes in a "picket fence" orientation (i.e. bars and spaces oriented parallel to the direction of code motion) are more easily scanned, thereby requiring fewer scan lines to do a good scanning job. As the code orientation changes, and tends toward a "ladder" orientation (i.e. bars and spaces oriented perpendicular to the direction of code motion), more scanning lines are required to maintain the same level of performance.

In NCR's 7878 bioptic laser scanning bar code symbol reader, a single, centered laser and a 6-sided irregular polygon is employed to produce an approximate 180 degree sweep (i.e. scanning region), wherein the center third of the scanning region consists of 6 scanning lines, and the left and right third scanning regions each consist of only 3 scanning lines. While the NCR prior art system employs non-uniform scan density with respect to line orientation, in an attempt to provide a more robust scanning pattern, its scan density is not sufficiently non-uniform with respect to line orientation, in many applications, and consequently, scanning performance is compromised.

Thus, there is still a great need in the art for improved bi-optical laser scanning bar code symbol reading system which is capable of high-performance, and robust operations in demanding POS scanning environments, while avoiding the shortcomings and drawbacks of prior art systems and methodologies.

OBJECTS AND SUMMARY

Accordingly, a primary object of the present disclosure is to provide new and improved laser scanning bar code symbol reading system for use in POS environments, which is free of the shortcomings and drawbacks of prior art systems and methodologies.

Another object of the present disclosure is to provide an improved laser scanning system employing multiple off-center lasers and an irregular multi-sided scanning polygon (i.e. where the interior angles between the sides are not all equal), producing a non-uniform laser scanning raster pattern over a total sweep of approximately 180 degrees of polygon rotation, and covering a scanning region includes (i) a center scanning region with a first plurality of scanning lines, two mid scanning regions with a second plurality of scanning lines, and far left and right scanning regions each having a third plurality of scanning lines, to support high (full) density, mid (⅔) density, and low (⅓) density scanning over the 180 degrees scanning region, for robust omni-directional scanning performance.

Another object is to provide a new and improved laser scanning system employing a pair of off-center lasers and an irregular 8-sided scanning polygon, producing a non-uniform laser scanning raster pattern over a total sweep of approximately 180 degrees of polygon rotation (i.e. sweep), and covering a scanning region which includes (i) a center scanning region from about 60 to about 120 degrees with twelve (12) scanning lines, (ii) two mid scanning regions from about 30 to about 60 degrees and from about 120 to about 150 degrees each having eight (8) scanning lines, and (iii) far left and right scanning regions from about 0 to about 30 degrees and from about 150 to about 180 degrees, each having four (4) scanning lines.

Another object is to provide a new and improved laser scanning system is provided employing a pair of off-center lasers and an irregular 6-sided scanning polygon, producing a non-uniform laser scanning raster over a total sweep of approximately 180 degrees of polygon rotation (i.e. sweep), and covering a scanning region which includes (i) a center scanning region from about 60 to about 120 degrees with 9 scanning lines, (ii) two mid scanning regions from about 30 to about 60 degrees and from about 120 to about 150 degrees each having 6 scanning lines, and (iii) far left and right scanning regions from about 0 to about 30 degrees and from about 150 to about 180 degrees, each having 3 scanning lines.

Another object is to provide a bi-optical laser scanning system employing a first and second laser scanning subsystems, wherein the first laser scanning system is installed in vertical housing section of the system, and the second laser scanning station in the horizontal housing section of the system, and wherein each laser scanning subsystem employs multiple laser beams, and a single, common irregular multi-sided scanning polygon to generate different non-uniform laser scanning raster patterns, in the vertical and horizontal housing sections, which are folded in the vertical and horizontal housing sections by first and second laser scanning pattern folding mirror arrays, respectively, and projected laser scanning planes through the vertical and horizontal scanning windows which intersection in a 3D scanning volume disposed therebetween to generate an omni-directional laser scanning pattern for supporting robust omni-directional scanning performance.

Another object is to provide such a bi-optical laser scanning system, wherein at least two laser beams are positioned on one side of the scanning polygon in the first laser scanning subsystem, and at least two laser beams are positioned on the opposing side of the scanning polygon in the horizontal housing section, so that with each revolution of the multi-sided irregular scanning polygon, two completely separate non-uniform laser scanning raster patterns with 180 degrees of scan coverage are generated in the vertical and horizontal housing sections, respectively, and projected off separate laser scanning pattern folding mirror arrays and out of the vertical and horizontal scanning windows, respectively, and into the 3D scanning volume.

Another object is to provide a new and improved laser scanning system employing multiple off-center lasers and an irregular 8-sided scanning polygon, producing a non-uniform laser scanning raster pattern over approximately 180 degrees of polygon rotation, and covering a scanning region which includes (i) a center scanning region from about 60 to about 120 degrees with twelve (12) scanning lines, (ii) two mid scanning regions from about 30 to about 60 degrees and from about 120 to about 150 degrees each having eight (8) scanning lines, and (iii) far left and right scanning regions from about 0 to about 30 degrees and from about 150 to about 180 degrees, each having four (4) scanning lines.

Another object is to provide a new and improved laser scanning system employing multiple off-center lasers and an irregular 6-sided scanning polygon, producing a non-uniform laser scanning raster pattern over a total sweep of approximately 180 degrees of polygon rotation (i.e. sweep), a covering a scanning region which includes (i) a center scanning region from about 60 to about 120 degrees with 9 scanning lines, (ii) two mid scanning regions from about 30 to about 60 degrees and from about 120 to about 150 degrees each having 6 scanning lines, and (iii) far left and right scanning regions from about 0 to about 30 degrees and from about 150 to about 180 degrees, each having 3 scanning lines.

Another object is to provide a hybrid-type bi-optical bar code symbol reading system comprising: first and second laser scanning subsystems, wherein each laser scanning subsystem includes multiple off-center lasers, and an irregular multi-sided scanning polygon, in common with both laser scanning subsystems, and producing a non-uniform laser scanning raster pattern over a total sweep of approximately 180 degrees of polygon rotation (i.e. scanning region) and projecting through the vertical and horizontal scanning windows and into a 3D scanning volume; and a digital imaging module projecting a field of view (FOV) and field of illumination (FOI) out into the 3D scanning volume, to enable laser scanning and digital imaging of bar code symbols at a POS station, in a user-transparent manner.

Another object is to provide such a hybrid-type bi-optical bar code symbol reading system, wherein the scanning region includes (i) a center scanning field with a first plurality of scanning lines, (ii) two mid scanning fields with a second plurality of scanning lines, and (iii) far left and right scanning fields, each having a third plurality of scanning lines, to support high (full) density, mid (⅔) density, and low (⅓) density scanning over the 180 degrees scanning region, within a 3D scanning volume between the vertical and horizontal scanning windows;

Another object is to provide a hybrid-type bi-optical bar code symbol reading system that helps provide improvements in worker productivity and checkout speed and throughput.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying figure Drawings in which:

FIG. 1A is a first perspective view of hybrid-type bi-optical bar code symbol reading system according to first illustrative embodiment of the present disclosure, adapted for use at a point of sale (POS) checkout station in a retail environment, and capable of supporting several different modes of operation including a hybrid laser scanning and digital imaging mode of operation, a laser scanning only mode of operation, and a digital imaging only mode of operation;

FIG. 2A is a perspective view of the digital imaging module (i.e. digital imaging subsystem) employed in the hybrid-type bi-optical bar code symbol reading system of FIGS. 1A through 1D, showing its area-type image detection array mounted on a PC board supporting drivers and control circuits, and surrounded by a pair of linear arrays of LEDs for directly projecting a field of visible illumination (FOI) spatially co-extensive with and spatially-overlapping the FOV of the digital imaging subsystem;

FIG. 2B is a side view of the digital imaging module shown in FIG. 2A, showing the field of visible illumination produced by its array of LEDs being spatially co-extensive with and spatially-overlapping the FOV of the digital imaging subsystem;

FIG. 2C is an exploded view of the digital imaging module shown in FIG. 2A;

FIG. 3 is a rear perspective view of the hybrid-type bi-optical bar code symbol reading system of FIGS. 1A and 1B, showing a portal with a cavity formed in the rear section of the system housing, for receipt of a digital imaging module for projecting the FOV and illumination field produced from the digital imaging module when it is installed within the portal;

FIG. 4 is a cross-sectional view of the hybrid-type bi-optical bar code symbol reading system of FIGS. 1A through 1E and 3, showing the digital imaging module installed through the portal and into the cavity formed in the rear portion of the system housing, with all of the electrical interfaces between the digital imaging module and system being established on completion of the module installation;

DETAILED DESCRIPTION OF THE ILLUSTRATIVE EMBODIMENT

Figure 1C:
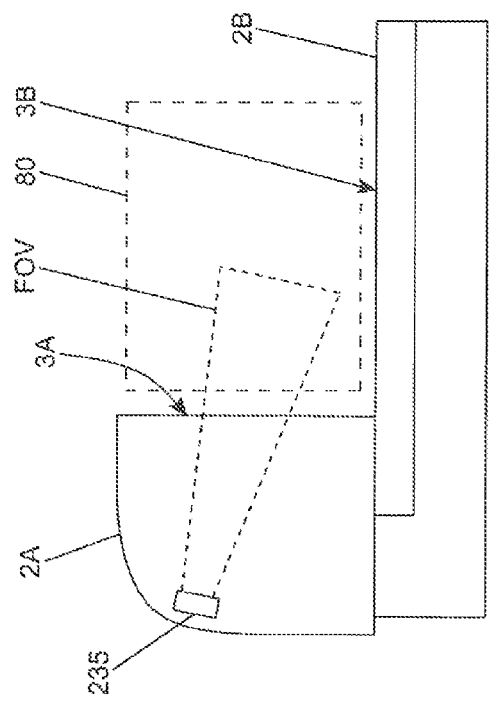
FIG. 1C is a first cross-sectional side view of the hybrid-type bi-optical bar code symbol reading system of FIGS. 1A and 1B, showing the FOV of digital imaging module being projected through the vertical scanning window, into the 3D scanning volume of the system, as an operator naturally presents a difficult to read code symbol closely towards the vertical scanning window.

Referring to the figures in the accompanying Drawings, the various illustrative embodiments of the apparatus and methodologies will be described in great detail, wherein like elements will be indicated using like reference numerals.
Overview of the Laser Scanning Assembly of the Present Disclosure The present disclosure teaches a novel laser scanning assembly comprising an irregular polygon scanning element, and multiple off-axis lasers arranged to generate a laser scanning raster pattern having a highly non-uniform scanning density over its scanning region, illustrated in FIG. 9. While it is understood that this novel laser scanning assembly can be used in diverse types of laser scanning systems, including slot-type laser scanners, laser projection scanner, as well as bi-optical laser scanning systems, for purposes of illustration, the laser scanning assembly will be described as embodied within a hybrid laser-scanning/digital-imaging (i.e. scanning/ imaging) based bar code symbol reading system 100 shown in FIGS. 1A through 1D.
Illustrative Embodiment of the Hybrid-Type Scanning/Imaging System In FIGS. 1A and 1B, the hybrid laser-scanning/digital-imaging (i.e. scanning/imaging) bar code symbol reading system 100 supports three different modes of operation, namely: a laser scanning (only) mode of operation; a digital imaging mode of operation; and a hybrid scanning/imaging mode of operation. The hybrid scanning/imaging system 100, and its various modes of operation, will now be described below in great technical detail.

Figure 1B:
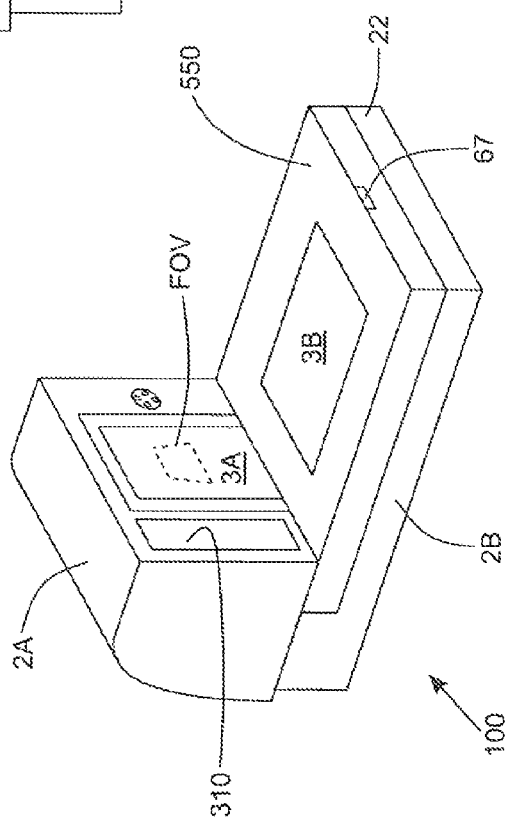
FIG. 1B a second perspective view of the hybrid-type bi-optical bar code symbol reading system of FIG. 1A, showing the field of view (FOV) and field of illumination (FOI) of the digital imaging subsystem directly projecting through the vertical scanning window in the vertical section of the system housing, and into the 3D laser scanning volume supported by the system.

As shown in FIGS. 1A, 1B and 1C, the hybrid scanning/ imaging code symbol reading system includes a system housing 2 having a vertical housing section 2A having a vertical optically transparent (glass) scanning window 3A, and a horizontal housing section 2B having a horizontal optically transparent (glass) scanning window 3B. As shown, the horizontal and vertical sections 2A and 2B are arranged in an orthogonal relationship with respect to each other such that the horizontal and vertical scanning windows are substantially perpendicular. First and second laser scanning stations 150A and 150B are mounted within the system housing, and provide a resultant laser scanning subsystem 150 for generating and projecting a complex group of laser scanning planes through laser scanning windows 3A and 3B where the laser scanning planes intersect and produce an omni-directional laser scanning pattern within a 3D scanning volume 80 defined between scanning windows 3A and 3B, as shown in FIGS. 1 and 1C, and other figures.

As shown in FIGS. 1A and 1B, an IR-based proximity detector 67 is mounted in the front portion of the housing for automatically detecting the presence of a human operator in front of the 3D scanning volume 80 region during system operation. The function of the IR-based proximity detector 67 is to wake up the system (i.e. WAKE UP MODE), and set a SLEEP Timer (T1) which counts how long the system has to read a bar code symbol (e.g. 15 minutes) before the system is automatically induced into its SLEEP MODE, where the polygon scanning element 394 and laser diodes 395A, 395B, 395C and 395D are deactivated to conserve electrical power within the system. Preferably, the IR-based proximity (i.e. wake-up) detector 67 is realized using (i) an IR photo-transmitter for generating a high-frequency amplitude modulated IR beam, and (ii) a IR photo-receiver for receiving reflections of the amplitude modulated IR beam, using a synchronous detection circuitry, well known in the art.

Figure 5:
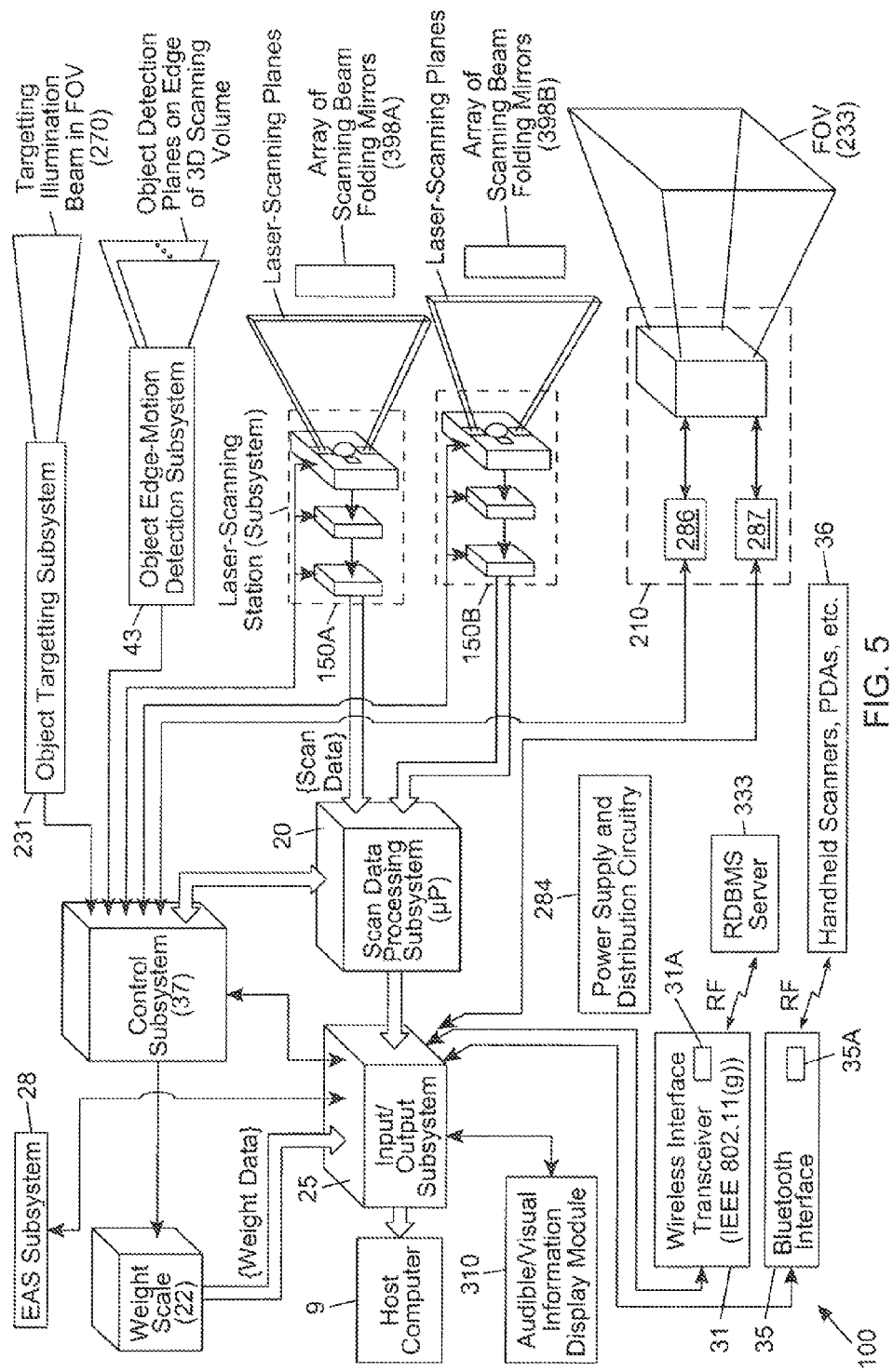
FIG. 5 is a block schematic representation of the hybrid scanning/imaging code symbol reading system of FIGS. 1A through 1D, wherein (i) a pair of laser scanning subsystems (i.e. stations) support omnidirectional laser scanning of bar code symbols on objects passing through the 3D scanning volume of the system, and (ii) a digital imaging module, supported within the system housing, supports digital imaging-based reading of bar code symbols presented within the FOV of the system.
Figure 6:
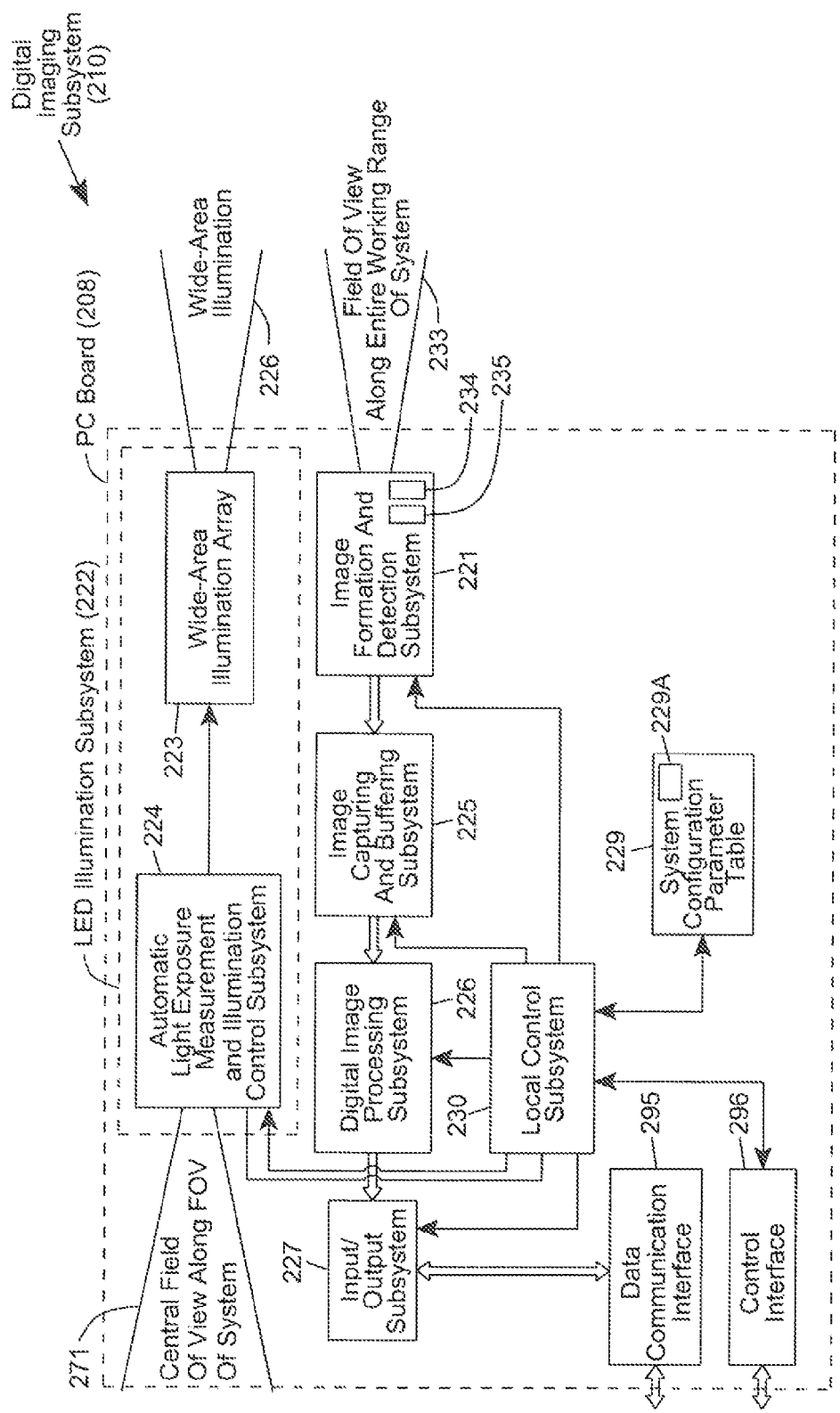
FIG. 6 is a block schematic representation of the digital imaging module supported within the hybrid scanning/imaging code symbol reading system of FIGS. 1A through 1D.

As shown in FIG. 1B, a digital camera mounting/installation portal 288 is formed in the upper housing section of the system housing, and has a geometry closely matching the geometry of the digital imaging module 210 so that the module slides and fits into the installation portal 288. As shown in FIGS. 5 and 6, the digital imaging module 210 has data and power/control interfaces 295 and 296 which are adapted to engage and establish electrical connections with matching data and power/control interfaces 287 and 286, respectively, mounted within the interior portion of the portal 288.

As shown in FIG. 1C, installation portal 288 is formed within the vertical section of the housing, and includes a peep-type aperture 289 allowing the FOV and field of illumination (FOI) to project therethrough, and then directly through the vertical scanning window 3A, and into 3D scanning volume 80. Preferably, the field of view (FOV) will extend at least several inches (e.g. 6 inches or more) into the 3D scanning volume 80, with a depth of focus before the vertical scanning window 3A.

As shown in FIG. 1C, a target illumination subsystem 231 within the digital imaging module 210 can be configured to generate a visible targeting beam 270 that is projected along the FOV within the 3D scanning volume. Also, the automatic object detection subsystem 220 within the digital imaging module 210 can be configured to project an IR-based detection beam 232 through the vertical scanning window 3A, to detect an object being presented to the vertical scanning window 3A, and thereupon, activating the digital imaging module 210 to capture and process digital images of the presented product, and any bar code symbols supported on the surface thereof.

Alternatively, the object detection subsystem 220 can be disabled and the digital imaging module operated in its enhanced continuous imaging presentation mode, where digital images of the FOV are continuously captured, buffered and processed at a rate 60 frames per second.

As shown in FIG. 1C, during the hybrid scanning/imaging mode of operation, the FOV of the digital imaging module spatially overlaps a portion of the 3D scanning volume 80 of the system. However, in alternative embodiments, the digital imaging FOV can completely spatially overlap the entire 3D scanning volume 80, or simply fill in a region of space between the vertical scanning window and the edge portion of the 3D scanning volume 80. This way, when the operator presents a bar coded product through the 3D scanning volume, towards the vertical scanning window, "sure-shot" bar code reading operation will be ensured even when reading the most-difficult-to-read bar code symbols.

In FIGS. 2A through 2C, the physical construction of an illustrative embodiment of the digital imaging module 210 is shown in great technical detail. As shown, the digital imaging module 210 comprises: a PC board 208, on which area-type image detection array (i.e. sensor) 235 (e.g. 5.0 megapixel 2D image sensor), LED arrays 223A and 223B, and image formation optics 234, are mounted, along with the circuitry specified in FIG. 6; a mounting framework 242 attached to the PC board 208 as shown; module housing 243 for containing the PC board 208 and mounting framework 242, and having a light transmission aperture 244 allowing the FOV of the image sensor 235 and the field of illumination (FOI) from LED arrays 223A, 223B project out of the module housing 243, and ultimately through the peep-hole aperture 289 formed in the installation portal 288, when the module 210 is installed therein, as shown in FIG. 4; and data and power/control interfaces 287 and 286, respectively, mounted on PC board and extending through the module housing 243 so that matching interface connections can be established in the installation portal 288, when the module is installed therein.

As shown in the system diagram of FIG. 5, hybrid scanning/imaging system 100 generally comprises: laser scanning stations 150A and 150B for generating and projecting groups of laser scanning planes through the vertical and horizontal scanning windows 3A and 3B, respectively, and generating scan data streams from scanning objects in the 3D scanning volume 80; a scan data processing subsystem 20 for supporting automatic scan data processing based bar code symbol reading using the scan data streams generated from laser scanning stations 150A and 150B; an input/output subsystem 25 for interfacing with the image processing subsystem 20, the electronic weight scale 22, RFID reader 26, credit-card reader 27, Electronic Article Surveillance (EAS) Subsystem 28 (including a Sensormatic® EAS tag deactivation block 29 integrated in system, and an audible/visual information display subsystem (i.e. module) 310; a Blue-Tooth® RF 2-way communication interface 135 including RF transceivers and antennas 103A for connecting to Bluetooth® enabled hand-held scanners, imagers, PDAs, portable computers 136 and the like, for control, management, application and diagnostic purposes; digital imaging module 210 specified in FIG. 6, and having data/power/control interface 294 provided on the exterior of the module housing, and interfacing and establishing electrical interconnections with data/power/control interface 285 when the digital imaging module 210 is installed in its installation portal 288 as shown in FIG. 1C; a control subsystem 37 for controlling (i.e. orchestrating and managing) the operation of the laser scanning stations (i.e. subsystems 150A, 150B), the functions of the digital imaging module 210, and other subsystems supported in the system; and IR-based wake-up detector 67, operably connected to the control subsystem 37, for generating and supplying a first trigger signal to the system controller in response to automatic detection of an operator in proximity (e.g. 1-2 feet) of the system housing.

Figure 1D:
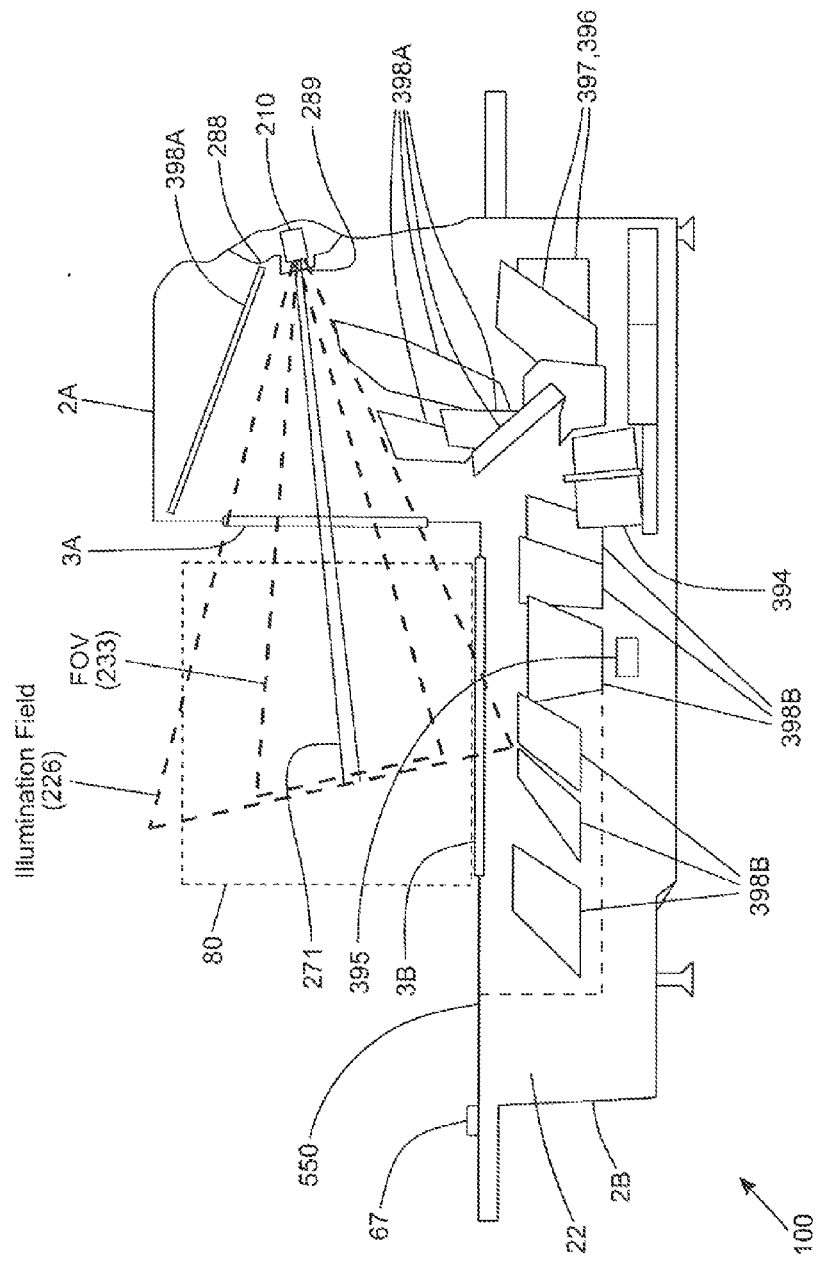
FIG. 1D is a second cross-sectional side view of the hybrid-type bi-optical bar code symbol reading system of FIGS. 1A and 1B, showing optical and electro-optical components of the digital imaging subsystem and the laser scanning subsystem containing within the system housing, and the FOV of the digital imaging system projecting through and spatially-overlapping with the field of view (FOV) of the laser scanning subsystem embedded within the vertical section of the system housing.
Figure 8:
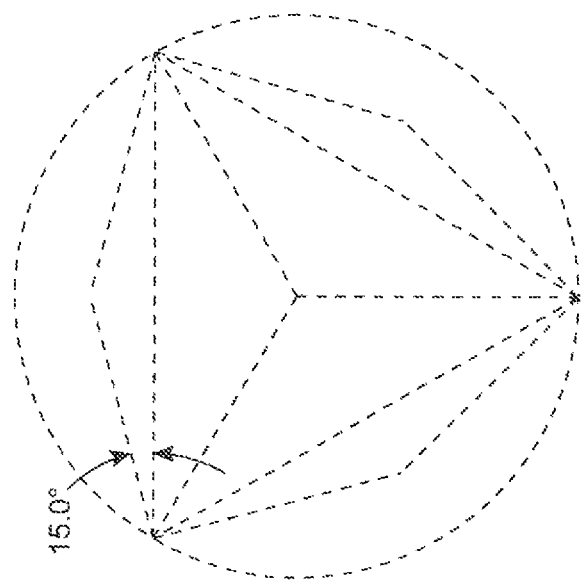
FIG. 8 is a schematic representation of an alternative embodiment of multi-sided irregular scanning polygon having six (6) sides (i.e. reflective surfaces) that can be deployed in the hybrid-type scanning/imaging system shown in FIGS. 1 through 6.
Figure 7:
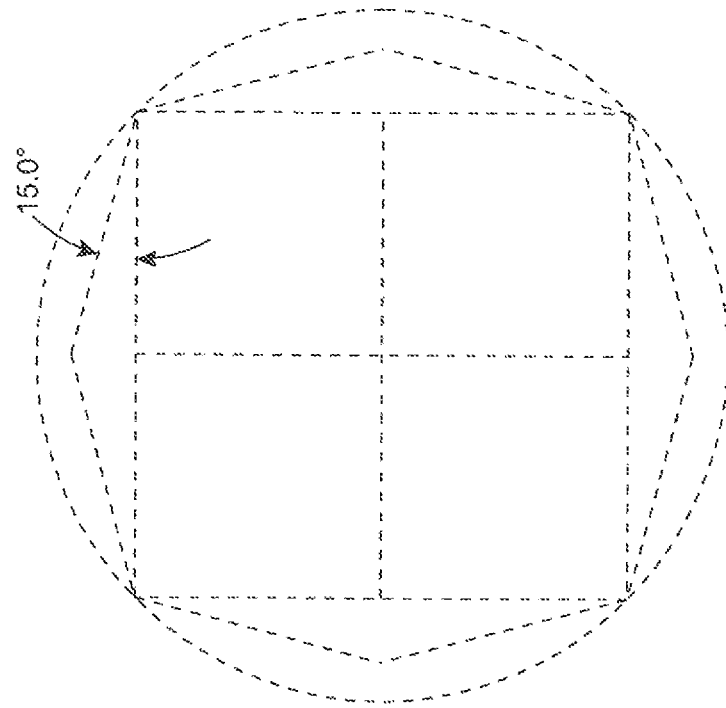
FIG. 7 is a schematic representation of the 8-sided irregular scanning polygon deployed in the hybrid-type scanning/imaging system shown in FIGS. 1 through 6.

In the illustrative embodiment disclosed herein, each laser scanning station 150A, 150B is constructed from a single, common "irregular" rotating polygon 394, having either 8-sides shown in FIG. 7 or 6-sides shown in FIG. 8, that is mounted at the junction between the vertical and horizontal housing sections 2A, 2B, and driven by a high-speed brushless DC motor, and associated drive and sensing circuitry, as shown in FIG. 1D. What makes the rotating polygon 394 irregular is the fact that interior angles between adjacent sides of the polygon element are not equal in size, and in fact, are substantially different so as to generate a raster scanning pattern having a highly non-uniform scan density, as illustrated in FIG. 9.

In the illustrative embodiment, laser scanning subsystem 150A comprises: a pair of visible laser diode sources (e.g. VLDs) 395A and 395B mounted off center to the central axis 399 of the system, for generating a first laser scanning raster pattern 410; light collection optics 396B and a pair of photodiodes 397A and 397B mounted so collect and detect incoming light rays produced by VLDs 395A and 395B, and generate corresponding analog electrical scan data signals for scan data and decode processing by scan data processing subsystem 20 shown in FIG. 5; and array of laser scanning pattern folding mirrors 398A installed in the horizontal housing sections, as shown in FIG. 1D, for folding the raster scanning pattern 410, and projecting a folded scanning pattern out the horizontal scanning window 3A and into the 3D scanning volume.

Also, laser scanning subsystem 150B comprises: a pair of visible laser diode sources (e.g. VLDs) 395C and 395D mounted off center to the central axis 399 of the system, for generating a second laser scanning raster pattern 420; light collection optics 396B and a pair of photodiodes 397C and 397D mounted so collect and detect incoming light rays produced by VLDs 395C and 395D, and generate corresponding analog electrical scan data signals for scan data and decode processing by scan data processing subsystem 20 shown in FIG. 5; and array of laser scanning pattern folding mirrors 398B installed in the horizontal housing sections, as shown in FIG. 1D, for folding the second raster scanning pattern 420 and projecting the folded scanning pattern through the vertical scanning window 3B, and out into the 3D scanning volume.

Figure 9:
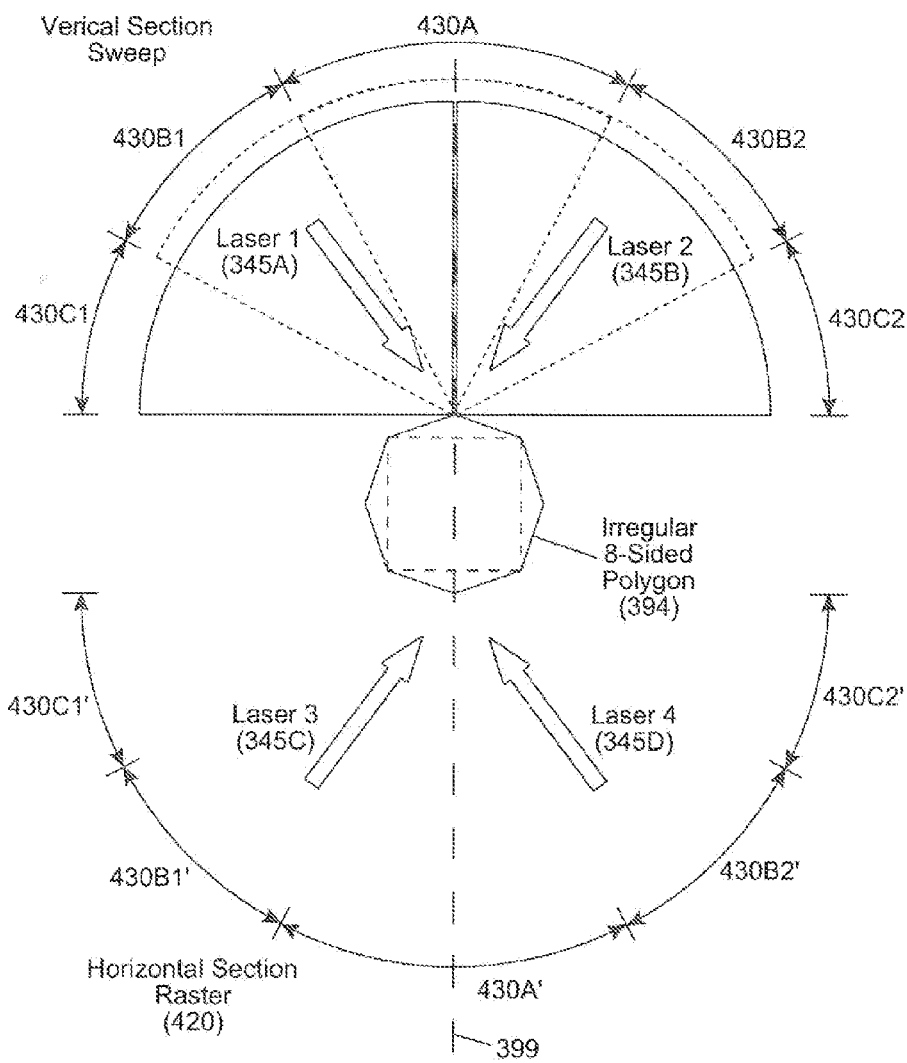
FIG. 9 is a schematic representation of the laser scanning subsystems deployed in the hybrid-type system shown in FIGS. 1 through 5, illustrating the use of two (2) off-center lasers and a single, common irregular multi-sided (e.g. 8-sided) scanning polygon in each laser scanning subsystem so as to produce a laser scanning raster over a total sweep of approximately 180 degrees of polygon rotation (i.e. sweep) and covering a scanning region which includes (i) a center scanning region with a first plurality of scanning lines, (ii) two mid scanning regions with a second plurality of scanning lines, and (iii) far left and right scanning regions each having a third plurality of scanning lines, thereby supporting high (full) density, mid (⅔) density, and low (⅓) density scanning over the 180 degrees scanning region, for robust omni-directional scanning performance, in accordance with the principles of the present disclosure.

As illustrated in FIGS. 1D and 9, laser beams from VLDs 395A and 395B are positioned on a first side of the scanning polygon 394 in the first laser scanning subsystem 150A, and laser beams 395C and 395D are positioned on the opposing side of the scanning polygon 394, mounted at the junction of the vertical and horizontal housing sections 2A, 2B. With this bi-optical laser scanning arrangement, during each complete revolution of the scanning polygon 394, two completely separate laser scanning raster patterns (410, 420) with 180 degrees of scan coverage are simultaneously generated in the vertical and horizontal housing sections, respectively, and projected/folded off laser scanning pattern folding mirror arrays 398A and 398B, respectively, and out the vertical and horizontal scanning windows 3A and 3B, respectively, and into the 3D scanning volume 80.

As shown in FIG. 9, laser scanning subsystem 150A produces a laser scanning raster pattern 410 over a total sweep of approximately 180 degrees of polygon rotation (i.e. sweep) and covering a scanning region 430 which includes: (i) a center scanning region (i.e. field) 430A from about 60 to about 120 degrees with twelve (12) scanning lines; (ii) two mid scanning regions (i.e. field) 430B1 and 430B2 from about 30 to about 60 degrees and from about 120 to about 150 degrees, each having eight (8) scanning lines; and (iii) far left and right scanning regions (i.e. fields) 430C1 and 430C2 from about 0 to about 30 degrees and from about 150 to about 180 degrees, each having four (4) scanning lines. The resulting laser scanning raster patterns generated the four off-center laser beams reflecting off the multi-side irregular polygon 394 while it is rotating, supports high (full) density, mid (⅔) density, and low (⅓) density scanning over the 180 degrees scanning region, for robust omni-directional scanning performance.

Similarly, as shown in FIG. 9, laser scanning subsystem 150B produces a laser scanning raster pattern 420 over a total sweep of approximately 180 degrees of polygon rotation (i.e. sweep) and covering a scanning region 430 which includes: (i) a center scanning region 430A' from about 60 to about 120 degrees with twelve (12) scanning lines; (ii) two mid scanning regions 430B1 and 430B2' from about 30 to about 60 degrees and from about 120 to about 150 degrees, each having eight (8) scanning lines; and (iii) far left and right scanning regions 430C1' and 430C2' from about 0 to about 30 degrees and from about 150 to about 180 degrees, each having four (4) scanning lines. The resulting laser scanning raster patterns are folded by the scanning pattern folding mirror arrays 398A and 398B to project laser scanning planes through the vertical and horizontal scanning windows 3A and 3B, for intersection in the 3D scanning volume 80 to support high (full) density, mid (⅔) density, and low (⅓) density scanning over the 180 degrees scanning region, for robust omni-directional scanning performance.

Alternatively, the irregular 6-sided scanning polygon 394' shown in FIG. 8 can be used instead of the 8-sided irregular scanning polygon shown in FIG. 7. In such an alternative embodiment, each laser scanning subsystem, 150A', 150B' will generate a laser scanning raster over a total sweep of approximately 180 degrees of polygon rotation (i.e. sweep), wherein the scanning region includes: (i) a center scanning region (i.e. field) from about 60 to about 120 degrees with 9 scanning lines; (ii) two mid scanning regions (i.e. fields) from about 30 to about 60 degrees and from about 120 to about 150 degrees each having 6 scanning lines; and (iii) far left and right scanning regions (i.e. fields) from about 0 to about 30 degrees and from about 150 to about 180 degrees, each having 3 scanning lines.

In FIG. 5, the bar code symbol reading module employed along each channel of the scan data processing subsystem 20 can be realized using conventional bar code reading techniques, including bar code symbol stitching-based decoding techniques, well known in the art.

As shown in FIG. 6, the digital imaging module or subsystem 210 employed in the illustrative embodiment of the hybrid scanning/imaging system 100 is realized as a complete stand-alone digital imager, comprising a number of components, namely: an image formation and detection (i.e. camera) subsystem 221 having image formation (camera) optics 234 for producing a field of view (FOV) upon an object to be imaged and a CMOS or like area-type image detection array 235 for detecting imaged light reflected off the object during illumination operations in an image capture mode in which at least a plurality of rows of pixels on the image detection array are enabled; a LED-based illumination subsystem 222 employing an LED illumination array 232 for producing a field of narrow-band wide-area illumination 226 within the entire FOV 233 of the image formation and detection subsystem 221, which is reflected from the illuminated object and transmitted through a narrow-band transmission-type optical filter and detected by the image detection array 235, while all other components of ambient light are substantially rejected; an automatic light exposure measurement and illumination control subsystem 224 for controlling the operation of the LED-based illumination subsystem 222; an image capturing and buffering subsystem 225 for capturing and buffering 2-D images detected by the image formation and detection subsystem 221; a digital image processing subsystem 226 for processing 2D digital images captured and buffered by the image capturing and buffering subsystem 225 and reading 1D and/or 2D bar code symbols represented therein; an input/output subsystem 527 for outputting processed image data and the like to an external host system or other information receiving or responding device; a system memory 229 for storing data implementing a configuration table 229A of system configuration parameters (SCPs); data/power/control interface 294 including a data communication interface 295, a control interface 296, and an electrical power interface 297 operably connected to an on-board battery power supply and power distribution circuitry 293; a Bluetooth communication interface, interfaced with I/O subsystem 227; and a system control subsystem 230 integrated with the subsystems above, for controlling and/or coordinating these subsystems during system operation.

In addition, the hybrid system 100 also includes: an object targeting illumination subsystem 231 for generating a narrow-area targeting illumination beam 270 into the FOV, to help allow the user align bar code symbols within the active portion of the FOV where imaging occurs; and also an object detection subsystem 43 for automatically producing an object detection field within the FOV 233 of the image formation and detection subsystem 221, to detect the presence of an object within predetermined edge regions of the object detection field, and generate control signals that are supplied to the system control subsystem 230 to indicate when an object is detected within the object detection field of the system.

In order to implement the object targeting subsystem 231, a pair of visible LEDs can be arranged on opposite sides of the FOV optics 234, in the digital imaging module 210, so as to generate a linear visible targeting beam that is projected off a FOV folding and out the imaging window 203, as shown and described in detail in US Publication No. US20080314985 A1, incorporated herein by reference in its entirety. Also, the object motion detection subsystem 231 can be implemented using one or more pairs of IR LED and IR photodiodes, mounted within the system housing 2A, or within the digital imaging module 210, as disclosed in copending U.S. application Ser. No. 13/160,873 filed Jun. 15, 2011, incorporated herein by references, to automatically detect the presence of objects in the FOV of the system, and entering and leaving the 3D scanning volume 80.

The primary function of the image formation and detection subsystem 221 which includes image formation (camera) optics 234, is to provide a field of view (FOV) 233 upon an object to be imaged and a CMOS area-type image detection array 235 for detecting imaged light reflected off the object during illumination and image acquisition/capture operations.

The primary function of the LED-based illumination subsystem 222 is to produce a wide-area illumination field 36 from the LED array 223 when an object is automatically detected within the FOV. Notably, the field of illumination has a narrow optical-bandwidth and is spatially confined within the FOV of the image formation and detection subsystem 521 during modes of illumination and imaging. This arrangement is designed to ensure that only narrow-band illumination transmitted from the illumination subsystem 222, and reflected from the illuminated object, is ultimately transmitted through a narrow-band transmission-type optical filter subsystem 240 within the system and reaches the CMOS area-type image detection array 235 for detection and processing, whereas all other components of ambient light collected by the light collection optics are substantially rejected at the image detection array 535, thereby providing improved SNR, thus improving the performance of the system.

The narrow-band transmission-type optical filter subsystem 240 is realized by (i) a high-pass (i.e. red-wavelength reflecting) filter element embodied within at the imaging window 203, and (2) a low-pass filter element mounted either before the CMOS area-type image detection array 235 or anywhere after beyond the high-pass filter element, including being realized as a dichroic mirror film supported on at least one of the FOV folding mirrors employed in the module.

The automatic light exposure measurement and illumination control subsystem 224 performs two primary functions: (i) to measure, in real-time, the power density [joules/cm] of photonic energy (i.e. light) collected by the optics of the system at about its image detection array 235, and to generate auto-exposure control signals indicating the amount of exposure required for good image formation and detection; and (2) in combination with the illumination array selection control signal provided by the system control subsystem 230, to automatically drive and control the output power of the LED array 223 in the illumination subsystem 222, so that objects within the FOV of the system are optimally exposed to LED-based illumination and optimal images are formed and detected at the image detection array 235.

The primary function of the image capturing and buffering subsystem 225 is (i) to detect the entire 2-D image focused onto the 2D image detection array 235 by the image formation optics 234 of the system, (2) to generate a frame of digital pixel data for either a selected region of interest of the captured image frame, or for the entire detected image, and then (3) buffer each frame of image data as it is captured. Notably, in the illustrative embodiment, the system has both single-shot and video modes of imaging. In the single shot mode, a single 2D image frame (31) is captured during each image capture and processing cycle, or during a particular stage of a processing cycle. In the video mode of imaging, the system continuously captures frames of digital images of objects in the FOV. These modes are specified in further detail in US Patent Publication No. 2008/0314985 A1, incorporated herein by reference in its entirety.

The primary function of the digital image processing subsystem 226 is to process digital images that have been captured and buffered by the image capturing and buffering subsystem 225, during modes of illumination and operation. Such image processing operations include image-based bar code decoding methods as described in U.S. Pat. No. 7,128,266, incorporated herein by reference.

The primary function of the input/output subsystem 227 is to support universal, standard and/or proprietary data communication interfaces with host system 9 and other external devices, and output processed image data and the like to host system 9 and/or devices, by way of such communication interfaces. Examples of such interfaces, and technology for implementing the same, are given in U.S. Pat. No. 6,619,549, incorporated herein by reference.

The primary function of the system control subsystem 230 is to provide some predetermined degree of control, coordination and/or management signaling services to each subsystem component integrated within the system, when operated in its digital imaging mode of operation shown in FIG. 1D. Also, in the illustrative embodiment, when digital imaging module 210 is installed in portal 288, and interfaced with data/power/control interface 285, system control subsystem 230 functions as a slave controller under the control of master control subsystem 37. While this subsystem can be implemented by a programmed microprocessor, in the preferred embodiments of the present disclosure, this subsystem is implemented by the three-tier software architecture supported on micro-computing platform, described in U.S. Pat. No. 7,128,266, incorporated herein by reference.

The primary function of the system configuration parameter (SCP) table 229A in system memory is to store (in non-volatile/persistent memory) a set of system configuration and control parameters (i.e. SCPs) for each of the available features and functionalities, and programmable modes of supported system operation, and which can be automatically read and used by the system control subsystem 230 as required during its complex operations. Notably, such SCPs can be dynamically managed as taught in great detail in co-pending US Publication No. 2008/0314985 A1, incorporated herein by reference.

Illustrative Embodiment of the Control Process Supported within the Bi-Optical Hybrid Scanning/Imaging Code Symbol Reading System While the bi-optical hybrid scanning/imaging code symbol reading system 100 has the capacity to support various types of control processes during its hybrid scanning/imaging mode of operation, the preferred mode of operation is where the digital imaging subsystem supports a continuous streaming-type presentation mode of operation upon the detection of the operator by IR-based detection subsystem 67.

In response to subsystem 67 detecting the presence of an operator at the POS station, the system controller 37 overrides other controls and instructs (i.e. determines) that laser scanning subsystems 150A, 150B generate an omni-directional laser scanning field within the 3D scanning volume 80, while the digital imaging module 210 generates a field of illumination (FOI) consisting of 60 flashes per second with a 100 us long flash duration that is coextensive with the projected FOV so that the digital imaging subsystem continuously and transparently supports the digital image capture, buffering and processing at a least 60 frames per second (FPS), with less than 127 microsecond image sensor exposure time, and a re-read delay set to 100 milliseconds. By using 100 us long flash duration, the perceived illumination intensity is extremely low to the human vision system. Also, with a 100 mm internal optical throw, the digital imaging subsystem supports a 2" depth of field (DOF) resolution of 4.0 mil symbologies at the vertical scanning window 3A.

In alternative embodiments, the digital imaging module 210 can be configured in alternative ways, such as, for example, to continuously support the digital image capture, buffering and processing at a least 60 frames per second (FPS), with 50 microsecond to 100 microsecond image sensor exposure times, or using alternative system configuration parameters (SCPs). With a 120 mm internal optical throw, the digital imaging subsystem supports a 1.5" to 2" DOF resolution of 4.0 mil symbologies at the vertical scanning window 3A, with a slightly increased WOF at the vertical scanning window 3A.

Modifications that Come to Mind

The above-described system and method embodiments have been provided as illustrative examples of how the laser scanning subsystems can be adapted to generate omni-directional laser scanning patterns having a substantially non-inform scanning densities over the scanning field of the system. This has been achieved using multi-sided irregular scanning polygons and multiple off-axis laser beams. It is understood, however, that variations and modifications to such laser scanning apparatus will readily occur to those skilled in the art having the benefit of the present disclosure. All such modifications and variations are deemed to be within the scope of the accompanying Claims.

What is claimed is:

1. A laser scanning bar code symbol reading system comprising:
 a system housing having a vertical housing section having a vertical scanning window and a horizontal housing section having a horizontal scanning window;

a laser scanning subsystem disposed in said system housing;

wherein said laser scanning subsystem employs multiple off-center lasers directed onto an irregular multi-sided scanning polygon rotating about an axis of rotation, and producing a non-uniform laser scanning raster pattern over a total sweep of approximately 180 degrees of polygon rotation, and covering a scanning region including a center scanning region with a first plurality of scanning lines, two mid scanning regions with a second plurality of scanning lines, and far left and right scanning regions each having a third plurality of scanning lines, to support high density, mid density, and low density scanning over said 180 degrees scanning region;

wherein said multi-sided scanning polygon has multiple scanning surfaces and multiple interior angles, wherein said interior angles between said multiple scanning surfaces are not all equal; and a plurality of scanning pattern folding mirrors, for folding said non-uniform laser scanning raster pattern and generating and projecting a plurality of laser scanning planes through said vertical and horizontal scanning windows, which intersect within a 3D scanning volume defined between said vertical and horizontal scanning windows and provide an omni-directional laser scanning pattern within said 3D scanning volume, for scanning one or more objects within said 3D scanning volume and producing scan data for decode processing.

2. The laser scanning bar code symbol reading system of claim 1, which further comprises a scan data processor for processing said scan data produced by said laser scanning subsystem in effort to read a bar code symbol on each object passed through said 3D scanning volume, and generating symbol character data for each read bar code symbol.

3. The laser scanning bar code symbol reading system of claim 1, wherein said irregular multi-sided scanning polygon comprises an 8-sided irregular scanning polygon, producing a non-uniform laser scanning raster pattern over a total sweep of approximately 180 degrees of polygon rotation, and covering a scanning region which includes (i) a center scanning region from about 60 to about 120 degrees with twelve (12) scanning lines, (ii) two mid scanning regions from about 30 to about 60 degrees and from about 120 to about 150 degrees each having eight (8) scanning lines, and (iii) far left and right scanning regions from about 0 to about 30 degrees and from about 150 to about 180 degrees, each having four (4) scanning lines.

4. The laser scanning bar code symbol reading system of claim 1, wherein said irregular multi-sided scanning polygon comprises an 6-sided irregular scanning polygon, producing a non-uniform laser scanning raster pattern over a total sweep of approximately 180 degrees of polygon rotation, and covering a scanning region which includes (i) a center scanning region from about 60 to about 120 degrees with 9 scanning lines, (ii) two mid scanning regions from about 30 to about 60 degrees and from about 120 to about 150 degrees each having 6 scanning lines, and (iii) far left and right scanning regions from about 0 to about 30 degrees and from about 150 to about 180 degrees, each having 3 scanning lines.

5. The laser scanning bar code symbol reading system of claim 1, wherein each said scanning surface on said multi-sided irregular scanning polygon is a planar reflective surface.

6. A bi-optical laser scanning system comprising:

a system housing including a vertical housing section having a vertical scanning window, and a horizontal housing section having a horizontal scanning window, wherein said vertical housing section and said horizontal housing section are disposed in a substantially orthogonal relationship;

a first laser scanning subsystem installed in said vertical housing section, and a second laser scanning subsystem installed in said horizontal housing section;

a first laser scanning pattern folding mirror array mounted in said vertical housing section, and a second laser scanning pattern folding mirror array mounted in said horizontal housing section;

a multi-sided irregular scanning polygon mounted between said first and second housing sections, and rotating about an axis of rotation;

wherein said multi-sided irregular scanning polygon has multiple scanning surfaces and multiple interior angles, wherein said interior angles between said multiple scanning surfaces are not all equal; and wherein said first laser scanning subsystem includes at least one source for producing a first set of multiple laser beams that are directed off axis to strike said single multi-sided irregular scanning polygon rotating about said axis of rotation, and generate a first non-uniform laser scanning raster pattern in said vertical housing section;

wherein said second laser scanning subsystem includes at least one source for producing a second set of multiple laser beams that are directed off axis to strike said single irregular multi-sided scanning polygon rotating about said axis of rotation, and generate a second non-uniform laser scanning raster pattern in said horizontal housing section;

wherein said first non-uniform laser scanning raster pattern are folded in said vertical housing sections by said first laser scanning pattern folding mirror array, and projected as a first group of laser scanning planes through said vertical scanning window;

wherein said second non-uniform laser scanning raster pattern are folded in said horizontal housing sections by said second laser scanning pattern folding mirror array, and projected as a second laser scanning planes through said horizontal scanning window; and wherein said first and second groups of laser scanning planes intersect within a 3D scanning volume disposed within said vertical and horizontal scanning windows, to generate an omni-directional laser scanning pattern for supporting robust omni-directional scanning performance.

7. The bi-optical laser scanning system of claim 6, wherein said first set of multiple laser beams are positioned on a first side of said multi-sided irregular scanning polygon, and said second laser beams are positioned on the opposing side of said multi-sided irregular scanning polygon, so that with each revolution of said multi-sided irregular scanning polygon, (i) said first non-uniform laser scanning raster pattern with 180 degrees of scan coverage is generated in said vertical housing section, and projected off said first laser scanning pattern folding mirror array and out of said vertical scanning window, and into said 3D scanning volume; and (ii) said second non-uniform laser scanning raster pattern with 180 degrees of scan coverage is generated in said horizontal housing section, and projected off said second laser scanning pattern folding mirror array and out of said horizontal scanning window, and into said 3D scanning volume.

8. The bi-optical laser scanning system of claim 6, wherein said first set of multiple laser beams comprises first and second laser beams and said multi-sided irregular scanning polygon is an 8-sided irregular scanning polygon, producing said first non-uniform laser scanning raster pattern over approximately 180 degrees of polygon rotation, and covering a first scanning region which includes (i) a center scanning region from about 60 to about 120 degrees with twelve (12) scanning lines, (ii) two mid scanning regions from about 30 to about 60 degrees and from about 120 to about 150 degrees each having eight (8) scanning lines, and (iii) far left and right scanning regions from about 0 to about 30 degrees and from about 150 to about 180 degrees, each having four (4) scanning lines; and said wherein said second set of multiple laser beams comprises third and fourth laser beams, producing said second non-uniform laser scanning raster pattern over approximately 180 degrees of polygon rotation, and covering a second scanning region which includes (i) a center scanning region from about 60 to about 120 degrees with twelve (12) scanning lines, (ii) two mid scanning regions from about 30 to about 60 degrees and from about 120 to about 150 degrees each having eight (8) scanning lines, and (iii) far left and right scanning regions from about 0 to about 30 degrees and from about 150 to about 180 degrees, each having four (4) scanning lines.

9. The bi-optical laser scanning system of claim 6, wherein said first set of multiple laser beams comprises first and second laser beams and said multi-sided irregular scanning polygon is an 6-sided irregular scanning polygon, producing said first non-uniform laser scanning raster pattern over a total sweep of approximately 180 degrees of polygon rotation, a covering a first scanning region which includes (i) a center scanning region from about 60 to about 120 degrees with 9 scanning lines, (ii) two mid scanning regions from about 30 to about 60 degrees and from about 120 to about 150 degrees each having 6 scanning lines, and (iii) far left and right scanning regions from about 0 to about 30 degrees and from about 150 to about 180 degrees, each having 3 scanning lines; and said wherein said second set of multiple laser beams comprises third and fourth laser beams, producing said first non-uniform laser scanning raster pattern over a total sweep of approximately 180 degrees of polygon rotation, a covering a second scanning region which includes (i) a center scanning region from about 60 to about 120 degrees with 9 scanning lines, (ii) two mid scanning regions from about 30 to about 60 degrees and from about 120 to about 150 degrees each having 6 scanning lines.

10. The bi-optical laser scanning system of claim 6, wherein each said scanning surface on said multi-sided irregular scanning polygon is a planar reflective surface.

11. The bi-optical bar code symbol reading system of claim 6, which further comprises: a digital imaging module projecting a field of view (FOV) and field of illumination (FOI) out into said 3D scanning volume, to enable laser scanning and digital imaging of bar code symbols at a POS station, in a user-transparent manner.

12. A symbol reading system, comprising:
a system housing comprising a vertical housing section having a vertical scanning window and a horizontal housing section having a horizontal scanning window;
a laser scanning subsystem within the system housing, comprising:
an irregular, scanning polygon having an axis of rotation, multiple scanning surfaces, and multiple interior angles, wherein the interior angles between the multiple scanning surfaces are not all equal;
a laser source producing a first set of multiple laser beams directed onto the irregular, scanning polygon; and
wherein the laser scanning subsystem produces a first non-uniform raster pattern over a sweep encompassing an angular range of approximately 180 degrees about the polygon, the first non-uniform raster pattern covering a scanning region such that the scanning region's center has a first plurality of scanning lines, each of the scanning region's two mid sections has a second plurality of scanning lines, and each of the scanning region's left and right sections has a third plurality of scanning lines.

13. The symbol reading system of claim 12, wherein:
the first plurality is greater in number than the second plurality; and
the second plurality is greater in number than the third plurality.

14. The symbol reading system of claim 12, comprising a digital imaging module.

15. The symbol reading system of claim 12, wherein each of the irregular, scanning polygon's scanning surfaces is a planar reflective surface.

16. The symbol reading system of claim 12, wherein the irregular, scanning polygon is an eight-sided polygon.

17. The symbol reading system of claim 12, wherein:
the first plurality is three times greater in number than the third plurality; and
the second plurality is two times greater in number than the third plurality.

18. The symbol reading system of claim 12, wherein:
the first plurality of scanning lines is twelve scanning lines;
the second plurality of scanning lines is eight scanning lines; and
the third plurality of scanning lines is four scanning lines.

19. The symbol reading system of claim 12, wherein the laser scanning subsystem produces a second set of multiple laser beams directed onto the irregular, scanning polygon.

20. The symbol reading system of claim 12, wherein the laser scanning subsystem produces:
a second set of multiple laser beams directed onto the irregular, scanning polygon; and
a second non-uniform raster pattern.

* * * * *